(12) United States Patent
Aoki

(10) Patent No.: US 10,540,122 B2
(45) Date of Patent: Jan. 21, 2020

(54) IMAGE FORMING APPARATUS AND IMAGE FORMING SYSTEM

(71) Applicant: Toyokazu Aoki, Tokyo (JP)

(72) Inventor: Toyokazu Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/015,840

(22) Filed: Jun. 22, 2018

(65) Prior Publication Data

US 2019/0026049 A1 Jan. 24, 2019

(30) Foreign Application Priority Data

Jul. 20, 2017 (JP) ................. 2017-141282

(51) Int. Cl.
*G06F 3/12* (2006.01)
*H04N 1/00* (2006.01)
*G03G 15/00* (2006.01)

(52) U.S. Cl.
CPC ....... *G06F 3/1205* (2013.01); *G03G 15/6508* (2013.01); *G06F 3/122* (2013.01); *G06F 3/1238* (2013.01); *G06F 3/1239* (2013.01); *G06F 3/1259* (2013.01); *H04N 1/00525* (2013.01)

(58) Field of Classification Search
CPC .... G06F 3/1205; G06F 3/1222; G06F 3/1238; G06F 3/1259; G06F 3/1285; G06F 21/608; G06F 3/1239; G06F 21/70; G06F 21/88; G06F 21/80; G06K 15/16; G06K 15/1803; G06K 15/1809; G06K 15/4065; H04N 1/00525

USPC ....... 358/1.11–1.18, 1.2, 498; 399/8, 80, 82, 399/391
See application file for complete search history.

(56) References Cited

U.S. PATENT DOCUMENTS

| | | | | |
|---|---|---|---|---|
| 2005/0088679 A1* | 4/2005 | Martin | .................. | G06F 21/608 358/1.14 |
| 2005/0111857 A1* | 5/2005 | Negishi | .............. | G03G 15/6508 399/8 |
| 2006/0020805 A1* | 1/2006 | Osaka | ................ | H04N 1/00464 713/176 |
| 2006/0188284 A1* | 8/2006 | Ikeda | ................. | G03G 15/6502 399/82 |

(Continued)

FOREIGN PATENT DOCUMENTS

JP 2011-001194 1/2011

*Primary Examiner* — Chad Dickerson
(74) *Attorney, Agent, or Firm* — Harness, Dickey and Pierce, P.L.C.

(57) ABSTRACT

An image forming apparatus includes a printer unit; at least one of a copier unit and a facsimile unit; a lockable tray with a lock, to store a recording medium; an image formation controller to control at least one of the printer unit, the copier unit, and the facsimile unit in response to a request from a user. In response to a print request for printing using the lockable tray, the image formation controller determines whether the print request is from a user authorized to use the lockable tray based on association information between the lockable tray and the user authorized, and causes the printer unit to perform printing when the print request is from the user authorized. When the request is directed to the copier or facsimile unit, the image formation controller prohibits the copier or facsimile unit from performing printing using the lockable tray.

12 Claims, 17 Drawing Sheets

| TRAY NAME | STATUS | AVAILABLE APPLICATION |
|---|---|---|
| FIRST TRAY | NORMAL | COPY, PRINT, FAX |
| SECOND TRAY | NORMAL | COPY, PRINT, FAX |
| THIRD TRAY | LOCKED 1 | PRINT |
| FOURTH TRAY | LOCKED 2 | PRINT |
| FIRST EXTERNAL TRAY | NORMAL | COPY, PRINT, FAX |
| SECOND EXTERNAL TRAY | NORMAL | COPY, PRINT, FAX |

(56) References Cited

U.S. PATENT DOCUMENTS

| | | | |
|---|---|---|---|
| 2007/0024888 A1* | 2/2007 | Bailey | G06F 3/1222 |
| | | | 358/1.14 |
| 2008/0144127 A1* | 6/2008 | Tian | H04N 1/44 |
| | | | 358/474 |
| 2014/0376028 A1* | 12/2014 | Tsujita | G06K 15/4065 |
| | | | 358/1.14 |
| 2015/0278648 A1* | 10/2015 | Murata | G06K 15/16 |
| | | | 358/1.12 |
| 2018/0079324 A1* | 3/2018 | Laumeier | B60N 2/0722 |

* cited by examiner

FIG. 6

| TRAY NAME | STATUS | AVAILABLE APPLICATION |
|---|---|---|
| FIRST TRAY | NORMAL | COPY, PRINT, FAX |
| SECOND TRAY | NORMAL | COPY, PRINT, FAX |
| THIRD TRAY | LOCKED 1 | PRINT |
| FOURTH TRAY | LOCKED 2 | PRINT |
| FIRST EXTERNAL TRAY | NORMAL | COPY, PRINT, FAX |
| SECOND EXTERNAL TRAY | NORMAL | COPY, PRINT, FAX |

FIG. 7A

| TRAY NAME | STATUS | USER ID |
|---|---|---|
| | | PRINT APPLICATION SERIAL NO. |
| THIRD TRAY | LOCKED 1 | SN12345/00 |
| THIRD TRAY | LOCKED 1 | SN12345/01 |
| FOURTH TRAY | LOCKED 2 | SN12345/01 |

FIG. 7B

| TRAY NAME | STATUS | USER ID | |
|---|---|---|---|
| | | LOGIN ID | PASSWORD |
| THIRD TRAY | LOCKED 1 | Abcde | 123abc |
| THIRD TRAY | LOCKED 1 | Bcdef | 123bcd |
| FOURTH TRAY | LOCKED 2 | Bcdef | 123bcd |

FIG. 7C

| TRAY NAME | STATUS | USER ID |
|---|---|---|
| | | PRINT DATA EXTENSION |
| THIRD TRAY | LOCKED 1 | .xxx |
| FOURTH TRAY | LOCKED 2 | .yyy |

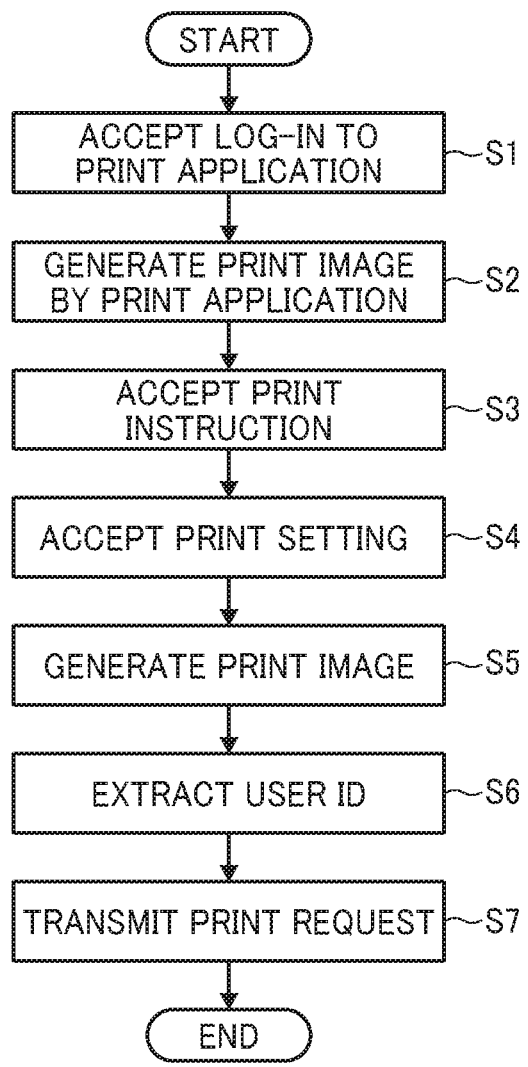

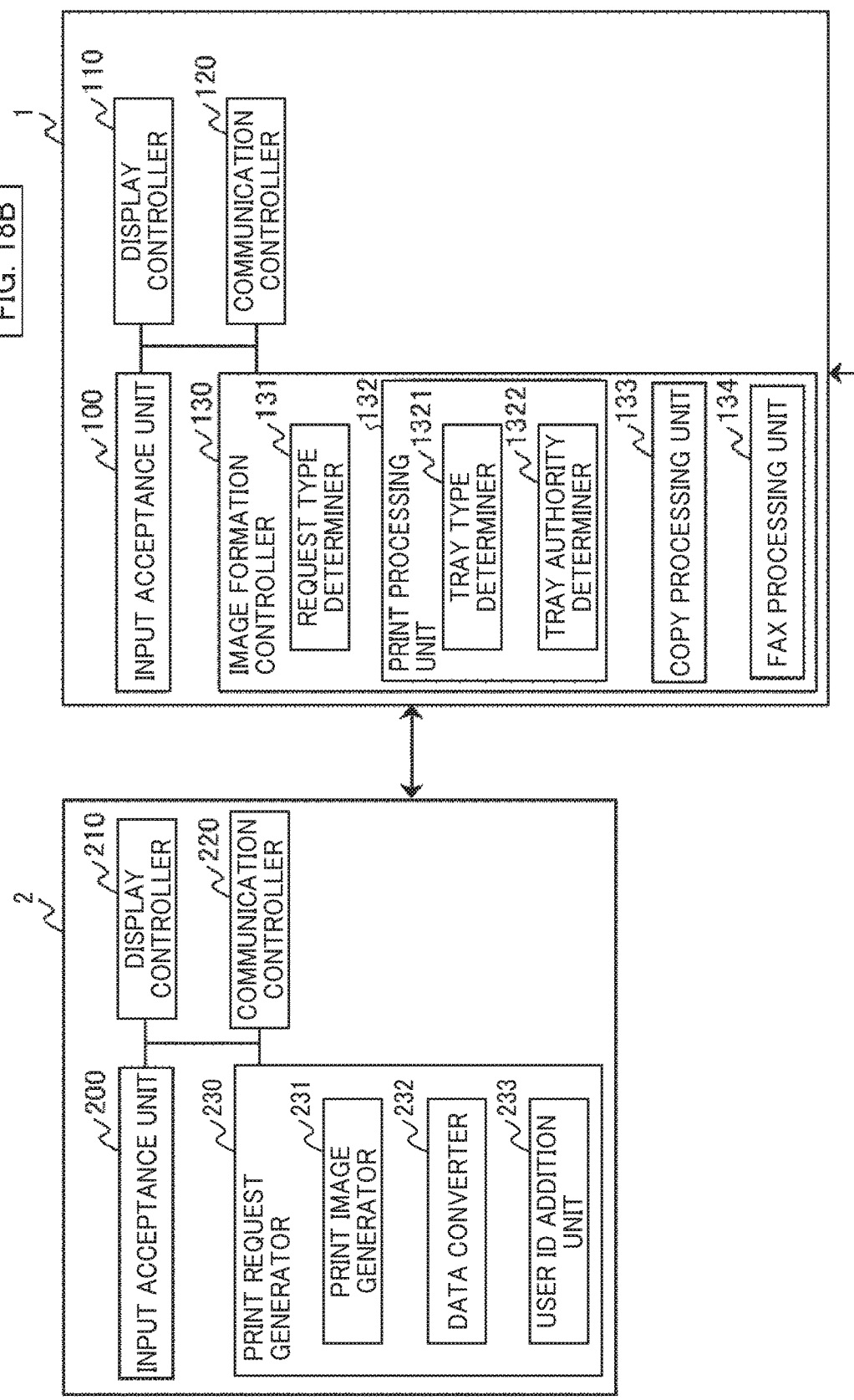

IMAGE FORMING APPARATUS AND IMAGE FORMING SYSTEM

CROSS-REFERENCE TO RELATED APPLICATIONS

This patent application is based on and claims priority pursuant to 35 U.S.C. § 119(a) to Japanese Patent Application No. 2017-141282, filed on Jul. 20, 2017, in the Japan Patent Office, the entire disclosure of which is hereby incorporated by reference herein.

BACKGROUND

Technical Field

The present disclosure generally relates to an image forming apparatus and an image forming system.

Description of the Related Art

There are special recording media (e.g., paper sheets) used for printing of confidential information. Examples of confidential documents include certificates issued by municipalities, various businesses, and various organizations; prescriptions issued by medical institutions; documents bearing information with property value; muniments; and various tickets. Special printing such as ground tint printing (background pattern printing) or a stamp is applied to sheets for such confidential information printing for security management.

Generally, in a printer or the like, sheets used for printing are stored in a tray. There is a possibility that the sheet is taken out while the sheet is stored. The above-described special sheets are expensive compared with standard paper sheets by the cost of special printing. If such special sheets are given to unspecified persons, the sheets may be used for forgery or illegal purposes. Therefore, being taking out from the tray is a problem.

SUMMARY

According to an embodiment of the present disclosure, an image forming apparatus includes: a printer unit; at least one of a copier unit and a facsimile unit; a lockable tray with a lock, to store a recording medium; an image formation controller to control at least one of the printer unit, the copier unit, and the facsimile unit in response to a request from a user. When the request is a print request requesting the printer unit to perform printing using the lockable tray, the image formation controller determines whether the print request is from a user authorized to use the lockable tray based on association information between the lockable tray and the user authorized to use the lockable tray, and causes the printer unit to perform printing when the print request is from the user authorized, when the request is directed to the copier unit or the facsimile unit, he image formation controller prohibits the copier unit or the facsimile unit from performing printing using the lockable tray.

According to another embodiment, an image forming system includes the above-described image forming apparatus and a terminal device. The terminal device is configured to transmit, to the image forming apparatus, the print request directed to the printer unit. The terminal device includes a printer driver configured to generate the print request, and the print request generated by the printer driver includes, at least, the print image, a selected tray, and user identification information for identifying the user being a source of the print request.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 illustrates an example of a tray type table;

FIGS. 7A, 7B, and 7C illustrate examples of tray authority tables;

FIG. 8 is a flowchart illustrating operation of the terminal device according to Embodiment 1;

FIGS. 18A and 18B that are functional block diagrams of an image forming apparatus, a terminal device, and the server apparatus according to Embodiment 4.

Figure 1:
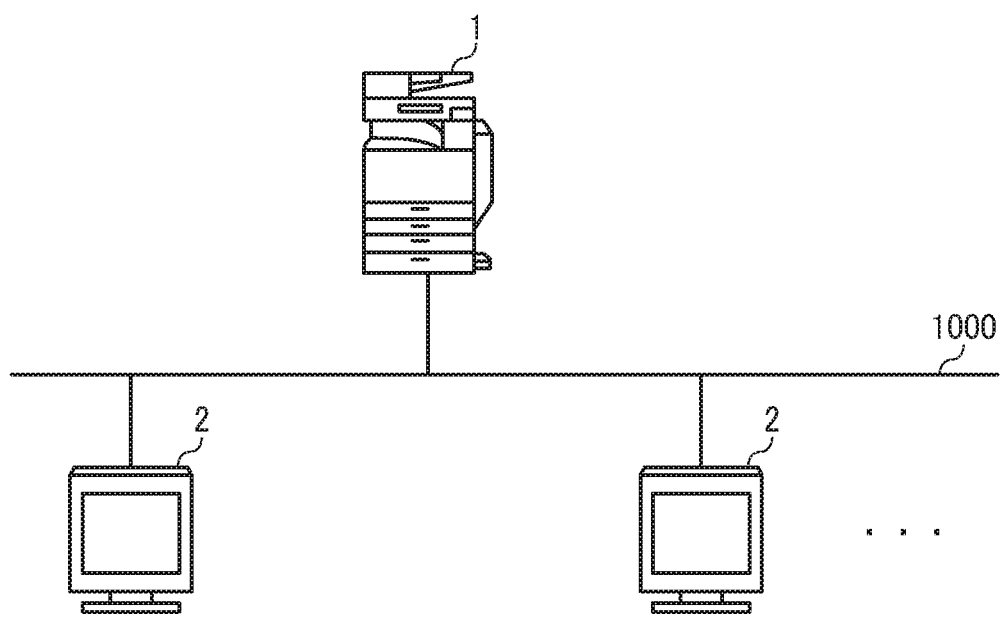
FIG. 1 is a diagram illustrating an example of a network configuration according to Embodiment 1.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of the present patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, an image forming apparatus and an image forming system according to embodiments of the present disclosure is described. As used herein, the singular forms "a", "an", and "the" are intended to include the plural forms as well, unless the context clearly indicates otherwise.

Descriptions are given below of a system configuration according to Embodiment 1 of the present disclosure. As illustrated in FIG. 1, an image forming apparatus 1 and a terminal device 2 such as a PC (Personal Computer) are connected to each other via a network 1000. A concept of the network 1000 includes a LAN (Local Area Network), the Internet, the Internet via a LAN, and the like. The terminal device 2 can be either wired to the network 1000 or wirelessly connected to the network 1000 as, for example, a so-called mobile terminal. A plurality of terminal devices 2 can be connected to one image forming apparatus 1.

The image forming apparatus 1 is a multifunction peripheral (MFP) having a plurality of functions such as a copy function, a facsimile (FAX) function, a print function, a scanner function, storing of an input image (of a document scanned or input by a printer or facsimile function), and distribution of the input image. In the present embodiment, the "image" processed by the image forming apparatus 1 includes, in addition to image data, data without image data, that is, text data.

Figure 2:
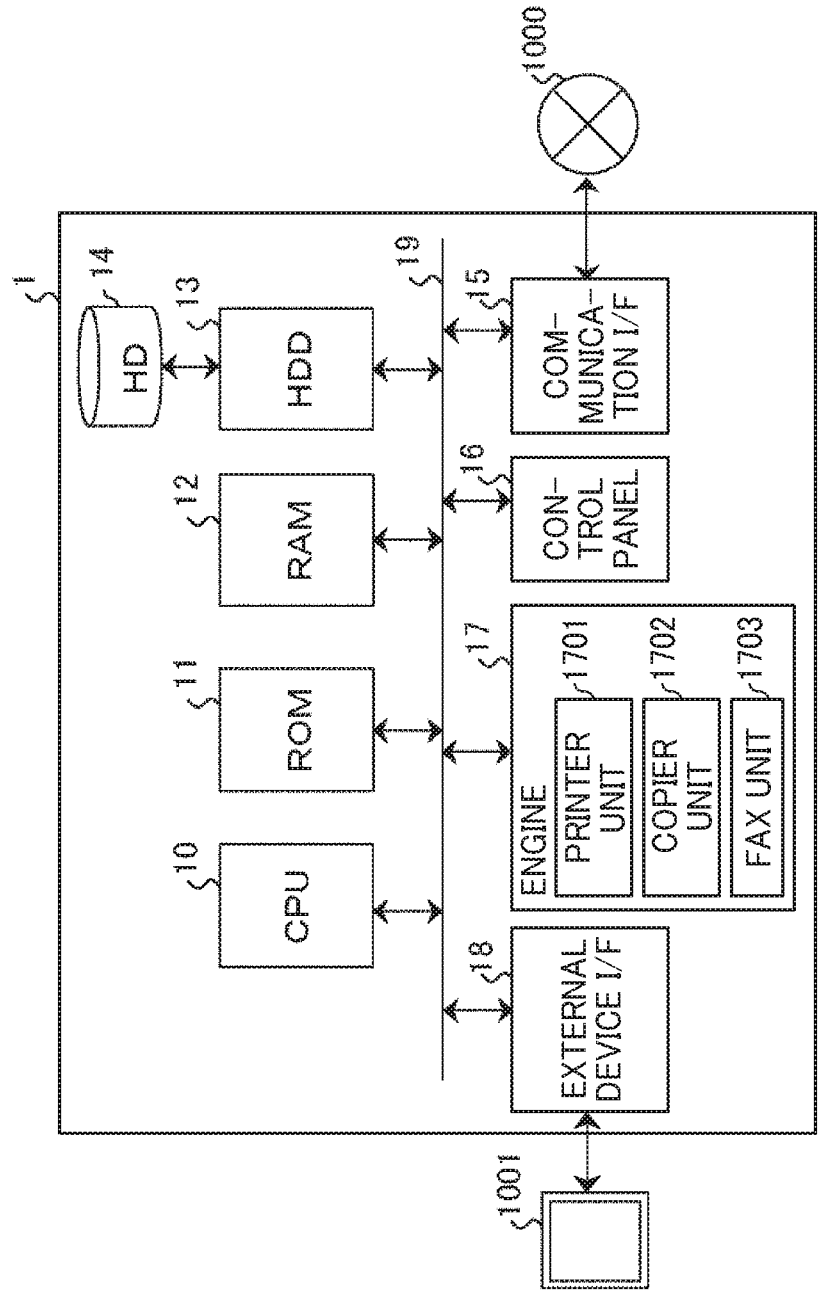
FIG. 2 is a block diagram illustrating a hardware configuration of an image forming apparatus according to Embodiment 1.

A hardware configuration of the image forming apparatus 1 is described below. As illustrated in FIG. 2, the image forming apparatus 1 includes a CPU (Central Processing Unit) 10, a ROM (Read Only Memory) 11, a RAM (Random Access Memory) 12, an HDD (Hard Disk Drive) 13, a communication interface (I/F) 15, a control panel 16 (e.g., an operation unit), an engine 17, and an external device I/F 18. These elements are connected with each other via a bus 19. Under the control of the CPU 10, the HDD 13 retrieves data from or writes data to an HD (Hard Disk) 14, which is a memory (recording medium) capable of storing electronic data.

The CPU 10 controls operation of the image forming apparatus 1. The CPU 10 executes programs stored in the ROM 11 or the HD 14, using the RAM 12 as a work area, to control the entire operation of the image forming apparatus 1. Thus, the CPU 10 implements various functions such as copying, scanning, facsimile communication, and printing functions described above. Execution of each of these functions (hereinafter referred to as "job") can be stored, each time, in the HD 14 as operation logs of the image forming apparatus 1.

The communication I/F 15 is an interface for connection with the network 1000.

The control panel 16 accepts various inputs corresponding to operation of an operation (or user) and displays various types of information such as information indicating the operation accepted, information indicating the operational status of the image forming apparatus 1, and information indicating the setting of the image forming apparatus 1. In one example, the control panel 16 is, but not limited to, an LCD (Liquid Crystal Display) having a touch panel function. In another example, the control panel 16 is an organic electroluminescence (EL) display having a touch panel function. In alternative to or in addition to the LCD or the EL display, the control panel 16 can include an input device (operation unit) such as hardware keys, a display such as an indicator lamp, or both.

The engine 17 is hardware that performs processing for functions, such as printing, copying, and facsimile communication functions, except general information processing and communication processing. The engine 17 includes a printer unit 1701 having a printing function, a copier unit 1702 having a copier function, a facsimile unit 1703 having facsimile function. The image forming apparatus 1 can further include optional devices, such as a finisher to sort printed sheets and an ADF (Automatic Document Feeder) to automatically feed documents.

The external device I/F 18 is an interface for connection with an IC (Integrated Circuit) card reader 1001 to read an IC card used by the operator to log in the control panel 16.

Figure 3:
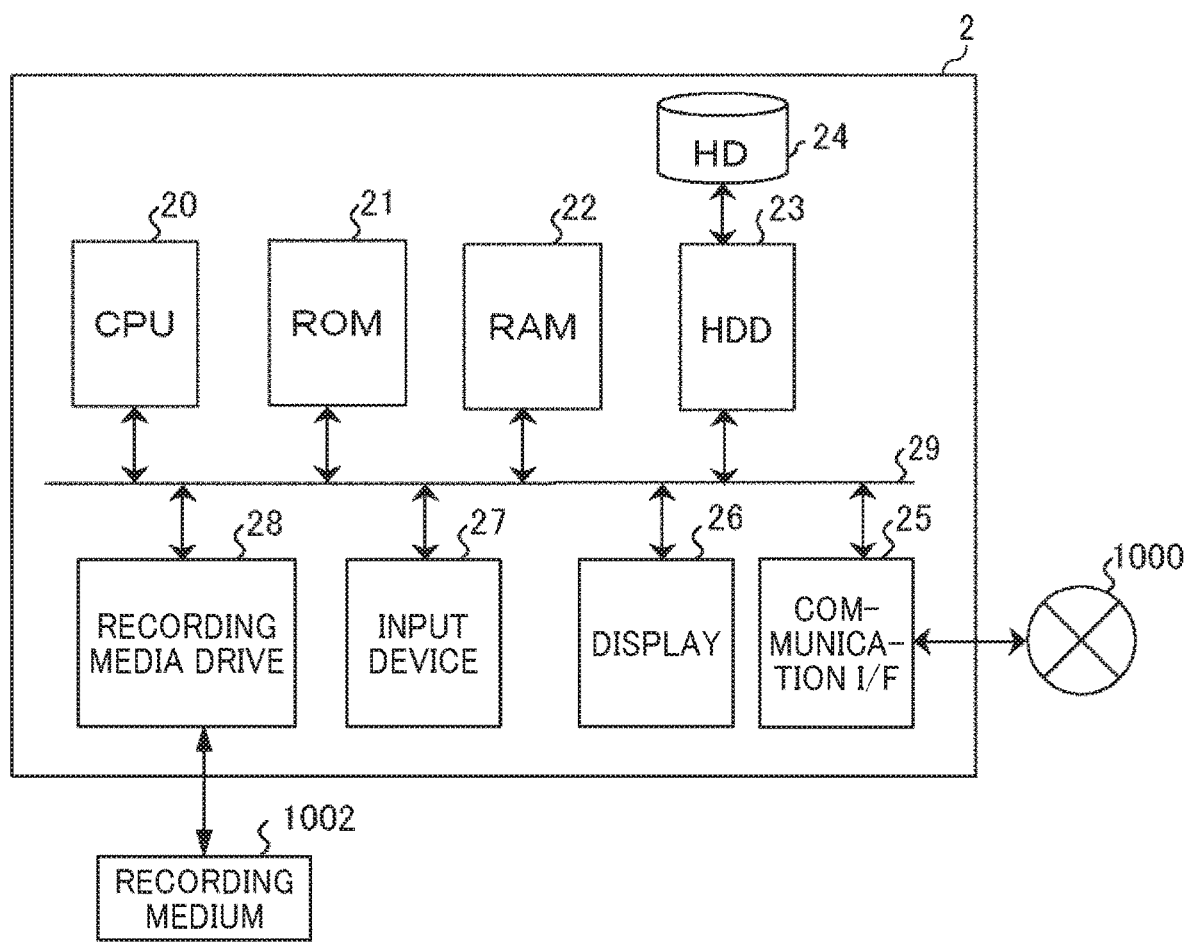
FIG. 3 is a block diagram illustrating a hardware configuration of a terminal device according to Embodiment 1.

Referring to FIG. 3, descriptions are given of a hardware configuration of the terminal device 2. The terminal device 2 includes a central processing unit (CPU) 20, a read only memory (ROM) 21, a random access memory (RAM) 22, a hard disk drive (HDD) 23, a communication I/F 25, a display 26, an input device 27, and a recording media drive 28, and those elements are connected with each other via a bus 29. Controlled by the CPU 20, the HDD 23 retrieves data from or writes data into the HD 24, which is a memory (recording medium) capable of storing electronic data.

The CPU 20 controls the operation of the terminal device 2. The CPU 20 executes programs stored in the ROM 21 or the HD 24, using the RAM 22 as a work area, to control the entire operation of the terminal device 2. Thus, the CPU 20 implements various functions corresponding to accepted inputs from the operator.

The input device 27 accepts various inputs corresponding to the operation of the operator. Examples of the input device 27 include, but not limited to, a keyboard and a mouse.

Figure 4:
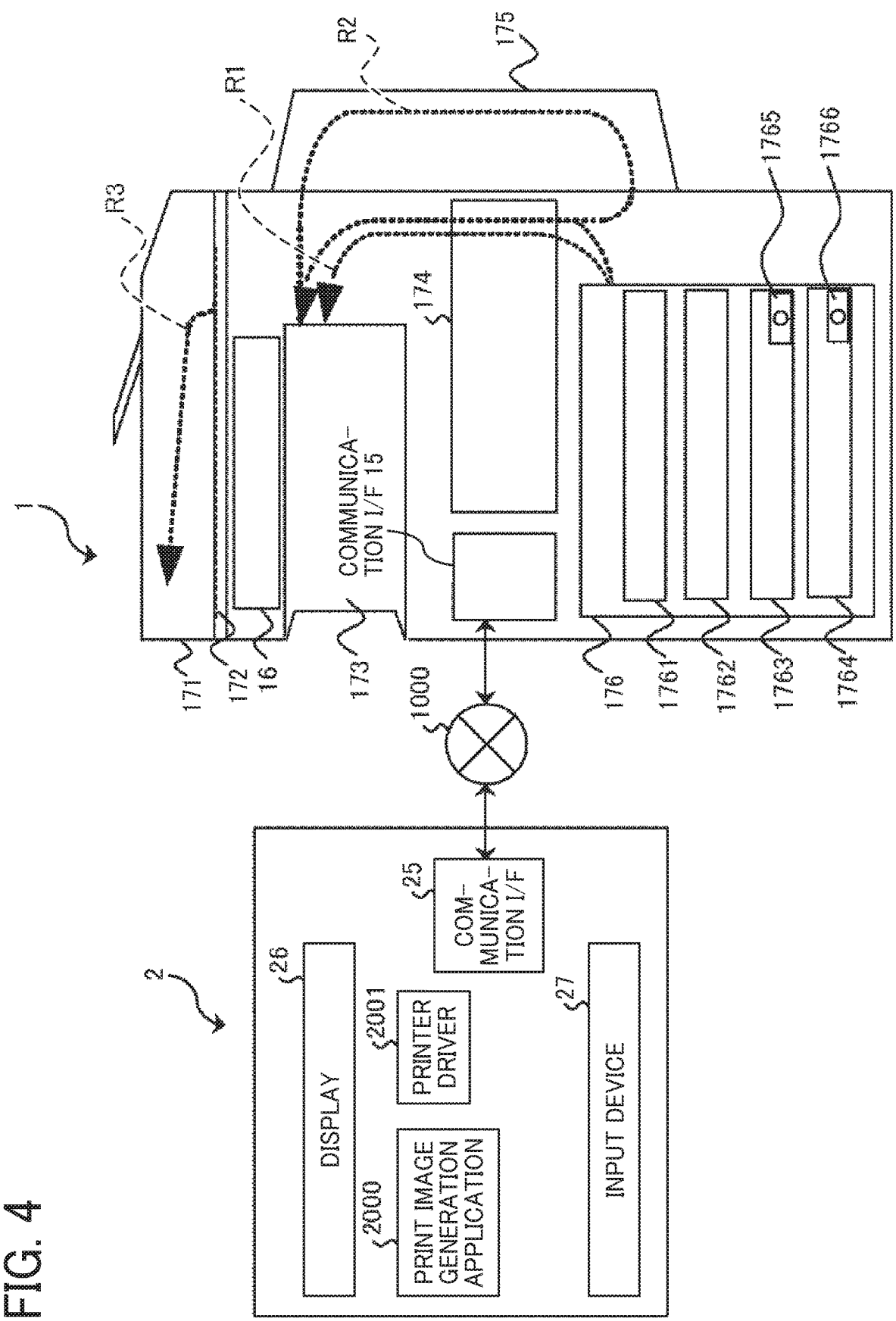
FIG. 4 is a schematic diagram illustrating a manner of use of the image forming apparatus and the terminal device according to Embodiment 1.

With reference to FIG. 4, an image forming system including the image forming apparatus 1 and the terminal device 2 will be described.

Descriptions are given of the printing function of the image forming apparatus 1. The image forming apparatus 1 according to the present embodiment has a printing function, which involves accepting a print command from the terminal device 2 via the network 1000 and performs printing on a recording medium such as a paper sheet.

The HD 24 of the terminal device 2 stores a print image generation application software 2000 (hereinafter also "print application 2000") and a printer driver 2001, which are programs executable by the CPU 20.

The print application 2000 is an application for creating a print image according to an input from the operator. In the present specification, the term "print image" represents an image to be printed on a recording medium such as a paper sheet. The printer driver 2001 is an application for converting print image into print data based on various settings relating to printing (hereinafter referred to as print settings) input by the operator. Print settings includes, for example, image quality, number of copies, page allocation, and a tray used. The term "print data" used here is data interpretable by the image forming apparatus 1 to cause the engine 17 to perform image formation on a recording medium.

As an operation of the terminal device 2, an operator of the terminal device 2 launches the print application 2000 to create print image. As the operator inputs a print instruction regarding the created print image, the printer driver 2001 is started up. Then, the operator inputs the print settings to the printer driver 2001.

Then, the printer driver 2001 converts the print image into print data, based on the print image created by the print application 2000 and the print settings input. The printer driver 2001 transmits at least the print data and the print settings, from the communication I/F 25 to the image forming apparatus 1 via the network 1000, as a request for the print function of the image forming apparatus 1 (hereinafter referred to as "print request").

Next, the image forming apparatus 1 will be described. The engine 17 of the image forming apparatus 1 includes an ADF 171, an image reading unit 172, a sheet ejection section 173, an image forming unit 174, a duplex unit 175, and a sheet feeder 176. The sheet feeder 176 includes a first tray 1761, a second tray 1762, a third tray 1763, a fourth tray 1764, a first lock 1765, and a second lock 1766.

The operator can pull out the first to fourth trays 1761 to 1764 from the image forming apparatus 1 and store unprinted recording media therein. In addition to the first to fourth trays, a removable tray can be optionally attached to the image forming apparatus 1.

A tray may be called a paper cabinet, a paper feed deck, a paper feed tray, a paper feed hopper, a paper tray, a manual feed tray (bypass feed tray), or the like. Further, a tray detachable from the image forming apparatus 1 may be called an external tray, a paper feeding cassette, a paper cassette, or the like.

The print request transmitted from the terminal device 2 to the image forming apparatus 1 includes information on the tray selected by the operator of the terminal device 2, as a part of the print settings. The recording medium is conveyed, to the engine 17, from the selected one of the first to fourth trays 1761 to 1764 of the sheet feeder 176, and the image forming unit 174 performs image formation thereon. In FIG. 4, as one example, a dotted line represents a conveyance passage of the recording medium fed from the sheet feeder 176 and discharged to the sheet ejection section 173. While the recording medium is conveyed along the conveyance passage, the image forming unit 174 forms an image thereon. The recording medium is conveyed along a conveyance passage R1 in single-sided printing and a conveyance passage R2 passing through the duplex unit 175 in duplex printing.

The third tray 1763 and the fourth tray 1764 further include the first lock 1765 and the second lock 1766, respectively. The third tray 1763 and the fourth tray 1764 can be physically fixed to the image forming apparatus 1 when locked by the first lock 1765 and the second lock 1766, respectively. As one example, the first lock 1765 and the second lock 1766 include general cylinder locks. As an operator or user inserts a key into a keyhole of the cylinder lock and turns the key, lock and unlock is executed. When locked, the tray is engaged with, for example, a main frame of the image forming apparatus 1 and is not pulled out from the image forming apparatus 1. Persons usable the key can be managed so that only a specified person or persons can open and close the third tray 1763 and the fourth tray 1764.

In other words, although anybody can take out a recording medium from the first tray 1761 and the second tray 1762, the third tray 1763 and the fourth tray 1764 are managed with keys in order to permit only the specified person to pull out the tray and remove a recording medium therefrom. Note that locking according to the present disclosure is not limited to locking using such a key and a keyhole, but can be an electronic lock. For example, an administrator logs in the apparatus from the control panel 16 to lock and unlock the electronic lock.

Next, descriptions are given below of copying by the image forming apparatus 1. For example, when an operator places a document to be copied on the ADF 171 or the image reading unit 172 and inputs a copy instruction from the control panel 16, a request for execution of copying (hereinafter also referred to as "copy request") is generated.

When the ADF 171 is used, the ADF 171 conveys the document to the image reading unit 172 along the conveyance passage R1 and discharges the document outside the apparatus. The image reading unit 172 is configured to optically read the document and generate image data. Based on the generated print data and print settings, the image forming unit 174 forms an image on the recording medium. After the image is formed thereon, the recording medium is discharged to the sheet ejection section 173.

The recording medium is fed from one of the first to fourth trays 1761 to 1764 of the sheet feeder 176, selected by the operator from the control panel 16, and the image forming unit 174 performs image formation thereon. In FIG. 4, as one example, the dotted line represents the conveyance passage along which the recording medium is fed from the sheet feeder 176, the image forming unit 174 forms an image thereon, and the recording medium is discharged to the sheet ejection section 173. The recording medium is conveyed along the conveyance passage R1 in single-sided printing and the conveyance passage R2 passing through the duplex unit 175 in duplex printing.

The facsimile function is similar to the description above. To print information received by facsimile, as the operator selects the tray, as a part of the print settings, from the control panel 16 of the image forming apparatus 1 or the input device 27 of the terminal device 2, a recording medium is fed from the selected tray, and the image forming unit 174 forms an image on the recording medium. Such operation is similar to the operation of printing and copying described above.

Note that the image forming unit 174 can employ, but not limited to, electrophotography, ink jet printing, or the like as a method capable of printing on a recording medium such as a paper sheet.

Figure 5:
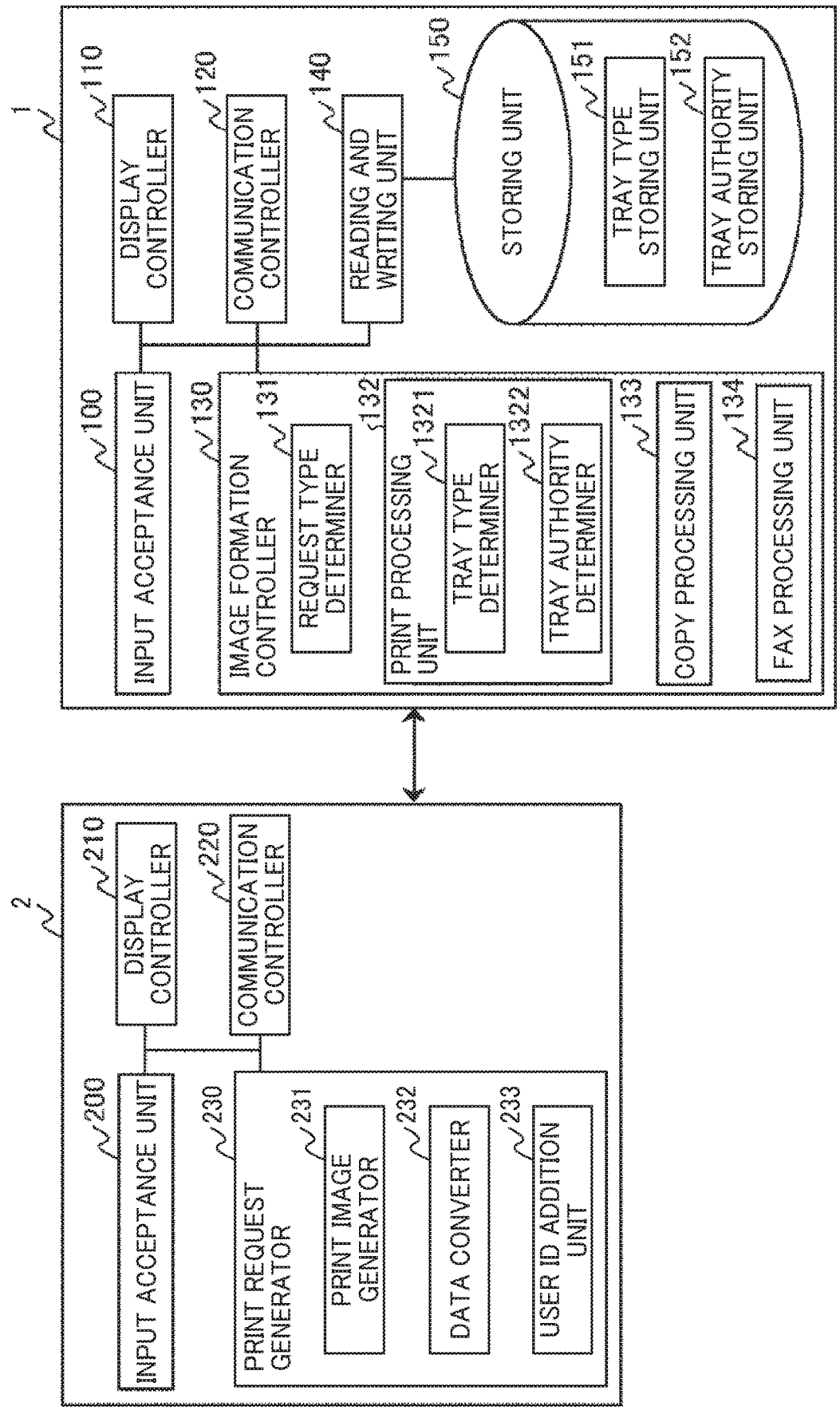
FIG. 5 is a functional block diagram of the image forming apparatus and the terminal device according to Embodiment 1.

FIG. 5 is a functional block diagram of the image forming apparatus 1 and the terminal device 2 according to Embodiment 1.

The image forming apparatus 1 includes an input acceptance unit 100, a display controller 110, a communications controller 120, an image formation controller 130, a reading and writing unit 140, and a storing unit 150.

The input acceptance unit 100 is implemented by processing of the control panel 16. The input acceptance unit 100 is configured to display information necessary for the operation to the operator and accept various inputs made by the operator.

The display controller 110 is implemented by the CPU 10 executing a program stored in the HD 14, and controls a display screen to be displayed on the input acceptance unit 100.

The communication controller 120 is implemented by the processing of the communication I/F 15. To email the image data to the outside or accept various types of setting information from an external device, the communication controller 120 communicates with the external device via the network 1000.

The image formation controller 130 is implemented by the CPU 10 executing a program stored in the HD 14 to execute copying, scanning, facsimile communication, and printing.

The reading and writing unit 140 is implemented by processing of the HDD 13 to store various types of data in the storing unit 150 or retrieve various types of data from the storing unit 150.

The storing unit 150 is executed by processing of the HD 14 to store programs, document data, various setting information necessary for the operation of the image forming apparatus 1, operation logs of the image forming apparatus 1, and the like.

The image formation controller 130 includes a request type determiner 131, a print processing unit 132, a copy processing unit 133, and a fax processing unit 134. The request type determiner 131 is implemented by the CPU 10 executing a program stored in the HD 14, to determine the function of the engine 17 requested. The print processing unit 132, the copy processing unit 133, and the FAX processing unit 134 are respectively implemented by the CPU 10 executing a print application, a copy application, and a FAX application, which are programs stored in the HD 14, to execute the copying, scanning, facsimile communication, and printing functions, respectively.

The storing unit 150 includes a tray type storing unit 151 and a tray authority storing unit 152. The tray type storing unit 151 and the tray authority storing unit 152 are implemented by the HD 14, to store tables (association information) described later, respectively.

The terminal device 2 includes an input acceptance unit 200, a display controller 210, a communications controller 220, and a print request generator 230.

The input acceptance unit 200 is implemented by processing of the input device 27 to receive various inputs made by the operator.

The display controller 210 is implemented by the CPU 10 executing a program stored in the HD 24 and configured to control a display screen displayed on the display 26.

The communication controller 220 is implemented by the processing of the communication I/F 25. To email the image data to the outside or accept various types of setting information from an external device, the communication controller 120 communicates with the external device via the network 1000.

The print request generator 230 is implemented by the CPU 20 executing a program stored in the HD 24. The print request generator 230 generates a print request, which is a request for executing of printing by the image forming apparatus 1, and transmits the print request via the communication controller 220 to the image forming apparatus 1.

The print request generator 230 includes a print image generator 231, a data converter 232, and a user identification (ID) addition unit 233. The print request generator 230 controls the print image generator 231, the data converter 232, and the user ID addition unit 233, to generate the print request.

The print image generator 231 is implemented by the CPU 20 executing the program (e.g., the print image generation application 2000 or print application 2000) stored in the HD 24. The print image generator 231 generates an image to be printed by the image forming apparatus 1, according to the operation of the operator on the terminal device 2.

The data converter 232 is implemented by the CPU 20 executing a program (e.g., the printer driver 2001) stored in the HD 24. The data converter 232 converts the generated print image into print data printable by the image forming apparatus 1, based on the generated print image and print settings.

The user ID addition unit 233 is implemented by the CPU 20 executing a program (e.g., the print application 2000 or the printer driver 2001) stored in the HD 24. The user ID addition unit 233 adds information (hereinafter "user ID") for identifying a user requesting the executing of printing.

The print request includes, at least, the aforementioned print data and print setting information, and print setting information includes, at least, information on the tray selected by the operator.

Usable as the information on the selected tray are, for example, respective tray names preliminarily assigned to the trays of the image forming apparatus 1. The operator can select one of the tray names, as the information of the selected tray, via the control panel 16 of the image forming apparatus 1 or the input device 27 of the terminal device 2. As another example, a tray number or the like preliminarily assigned to the tray of the image forming apparatus 1 can be used.

As the user ID to be added to the print request, the administrator can preliminarily specify the information for identifying the source of the print request. In one example, a print application is configured to register a license assigned to a purchaser (i.e., an operator) of the printing app or a terminal device to which the print application is downloaded. The operator logs in the print application to use the print application. In that case, the user ID can be identification information of an individual print application, such as a product key, a license key, a serial number, or a production serial number.

In another example, the user ID can be information for specifying the person operating the terminal device 2 that has issued the print request, such as a login ID to the terminal device, or a set of the login ID and a password.

In another example, the print application is custom-built and dedicated to a specific system. In that case, the user ID can be an extension of the print image (image file) created by the print application.

Depending on the type of the user ID, the user ID can be handled in either manner. For example, the print application 2000 collects the user ID and sends the user ID together with the print image to the printer driver 2001. Alternatively, the printer driver 2001 collects the user ID and adds the user ID to the print request. Yet alternatively, based on the print image sent from the print application 2000 to the printer driver 2001, the printer driver 2001 creates a user ID and adds the user ID to the print request.

Referring to FIG. 6, descriptions are given below of the tray type table (association information) stored in the tray type storing unit 151 illustrated in FIG. 5. The tray type storing unit 151 stores the following association information set by the administrator. Specifically, "Tray Name" of each tray of the image forming apparatus 1 is associated with "State" indicating whether or not the tray is managed with a key. "Status" is either "Normal" or "Locked". "Tray Name" is further associated with "Available Application" of applications (functions) including print application, copy application, and fax application. "Available Application" represents an application permitted to execute a function using that tray, that is, an application permitted to use that tray. In the table illustrated in FIG. 6, a locked tray is associated with only print application as "Available Application".

In the table in FIG. 6, two trays, namely, the third tray 1763 and the fourth tray 1764, are in the status "Locked". Considering a case where the trays are managed differently, the statuses "Locked 1 " and Locked 2 are used for distinguishing. The first tray 1761 and the second tray 1762 are associated with the status "Normal". The tray type determiner 1321 uses the selected tray name included in the print setting information as a key, to determine whether the tray is managed with a key or the status is "Normal". Then, the tray type determiner 1321 extracts applications permitted to execute functions using that tray.

In some cases, users may desire to use the third tray 1763 and the fourth tray 1764, which are lockable, as normal trays without locking. In that case, in the tray type table, for example, the tray is associated with "Normal" as "Status" and applications other than "Print" as "Available Application". Further, although, as available applications, "Copy", "Print", and "FAX" are associated with the tray in the status "Normal" in the table in FIG. 6, it is not necessary to associate all of these functions as available applications with the status "Normal".

Referring to FIG. 7, descriptions are given below of tray authority tables (association information) stored in the tray authority storing unit 152 illustrated in FIG. 5. In the table illustrated in FIG. 7A, the following information is preliminarily stored by the administrator. Specifically, for each of the third tray 1763 and the fourth tray 1764 that are lockable trays, the authority to use the tray is preliminarily stored in the table. In other words, the serial number of the print application 2000 is stored in advance, as the ID of the user authorized to perform printing on the recording medium stored in the tray. The third tray 1763 is managed with the status "Locked 1", and two serial numbers "SN 12345/00" and "SN 12345/01" are stored as the user IDs. The fourth tray 1764 is managed with the status "Locked 2", and a print application assigned with the serial number "SN 12345/01" is authorized to use the fourth tray 1764. Using the selected tray name as a key, the tray authority determiner 1322 extracts, as the user ID, the print application serial number.

As another example, in the table illustrated in FIG. 7B, the login ID and the password with which a user has logged in the terminal device 2 are stored as the user ID. Although the user can be managed with only the login ID, the user management can be more secure with a combination of the login ID and the password. The third tray 1763 is managed with the status "Locked 1". Use of the third tray 1763 is authorized to a user who logs in the terminal device 2 with a combination of the login ID "Abcde" and the password "123 abc", and a user who logs in the terminal device 2 with a combination of the login ID "Bcdef" and the password "123 bcd". The fourth tray 1764 is managed with the status "Locked 2" and associated with, as the user ID, a combination of the login ID "Bcdef" and the password "123 bcd". In the above case, using the selected tray name as a key, the tray authority determiner 1322 extracts a set of login ID and password, as the ID of the user authorized to use the tray.

As another example, in the table illustrated in FIG. 7C, the data extension of the print image is stored as the user ID. When the print application is custom-built and dedicated to a specific system as described above, the extension of the print image created by the print application is also unique and can be used as the user ID. The third tray 1763 is managed with the status "Locked 1"and associated with the data extension".xxx" of the print image as the user ID. The fourth tray 1764 is managed with the status "Locked 2"and associated with the data extension".yyy" of the print image as the user ID. In the above case, the tray authority determiner 1322 extracts the data extension of the print image as the user ID authorized to use the tray.

Referring to FIG. 8, descriptions are given below of operation of the terminal device 2 when the serial number of the print application is used as the user ID as illustrated in FIG. 7A. The print request generator 230 accepts a login to the print application 2000 performed by the operator (S1). The print image generator 231 generates a print image according to the input from the operator logged in the print application 2000 (S2). The print request generator 230 accepts an instruction to print the print image, from the operator (S3). The data converter 232 accepts the print settings by the operator and generates print data (S4).

There are various types of print settings. Here, the print settings at least include information on the selected tray, one example of which is the tray name selected by the operator, of the tray names assigned to the trays of the image forming apparatus 1. In a case where the operator desires to print the print image on a desired special sheet, the operator preliminarily knows the locked tray storing the special sheet and selects the locked tray.

The user ID addition unit 233 extracts, as the user ID, the serial number of the print application and adds the serial number to the information on the selected tray (S6). The print request generator 230 transmits, as one print request, the print data, the information on the selected tray, and the serial number of the print application as the user ID to the image forming apparatus 1 (S7).

Figure 9:
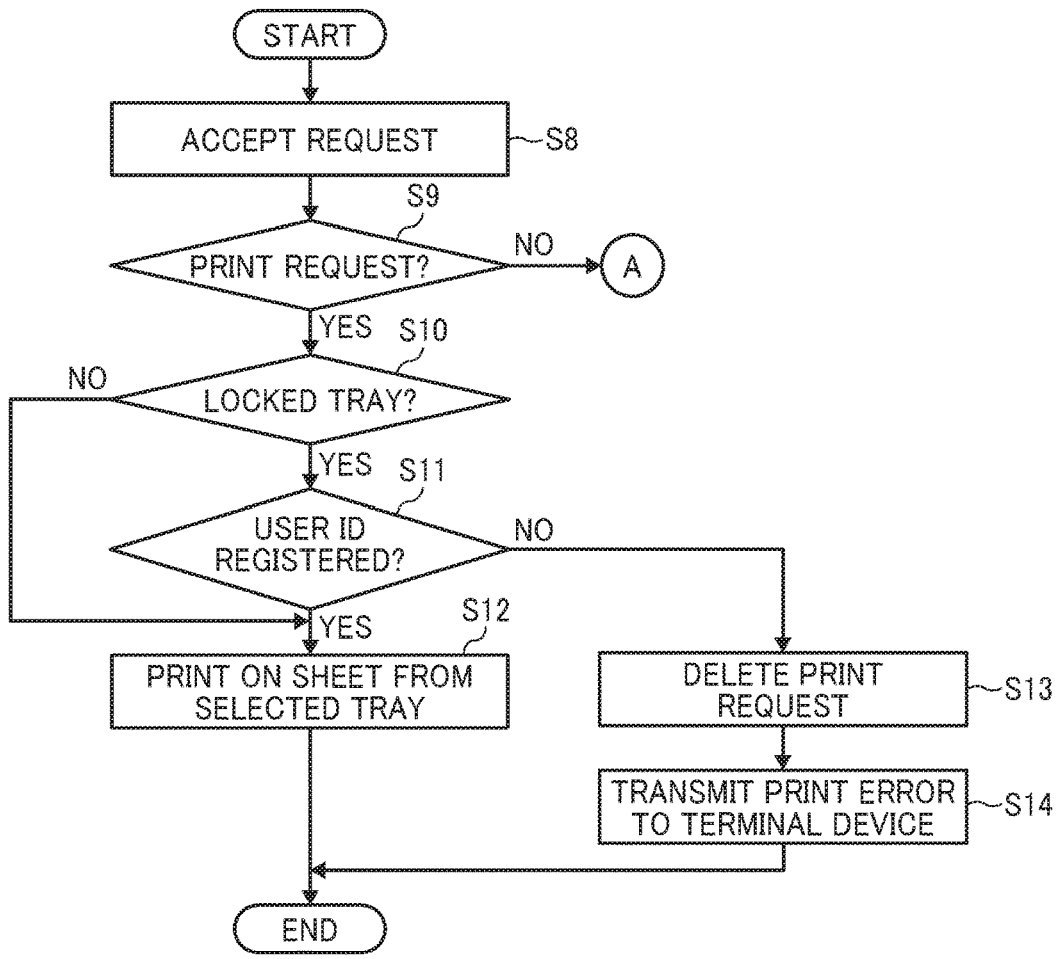
FIG. 9 is a flowchart illustrating operation of the image forming apparatus according to Embodiment 1.

Descriptions are given below of the operation of the image forming apparatus 1, with reference to FIG. 9. The image formation controller 130 accepts various requests for functions, such as printing, copying, and facsimile communication, from the control panel 16 of the image forming apparatus 1 and the input device 27 of the terminal device 2 (S8). The request type determiner 131 acquires the tray type table from the tray type storing unit 151 and determines whether the accepted request is a print request or another request, such as, a copy request, a FAX request, or the like (S9). If the accepted request is not a print request, the operation proceeds to flow A to be described later. In the case of a print request, the operation proceeds to S11 (S10).

The tray type determiner 1321 of the print processing unit 132 uses the selected tray name included in the print request as a key, to extract the status of the tray. Then, the tray type determiner 1321 determines whether or not the status is locked. When the tray type determiner 1321 determines that the selected tray is not locked, that is, the status is normal, the print processing unit 132 executes printing on the recording medium stored in the selected tray (S12). Then, the operation ends. If the selected tray is locked, the operation proceeds to S11. At S11, the tray authority determiner 1322 acquires the tray authority table from the tray authority storing unit 152 and use the selected tray name as a key to determine whether the user ID, that is, the serial number of the print application 2000 is registered in association with the selected tray name. When the tray authority determiner 1322 determines that the user ID has been registered, the print processing unit 132 executes printing on the sheet stored in the selected tray (S12). If the user ID is not registered, the print request is canceled (S13). Then, the tray authority determiner 1322 reports a print error to the terminal device 2 being the source of the print request (S14).

Figure 10:
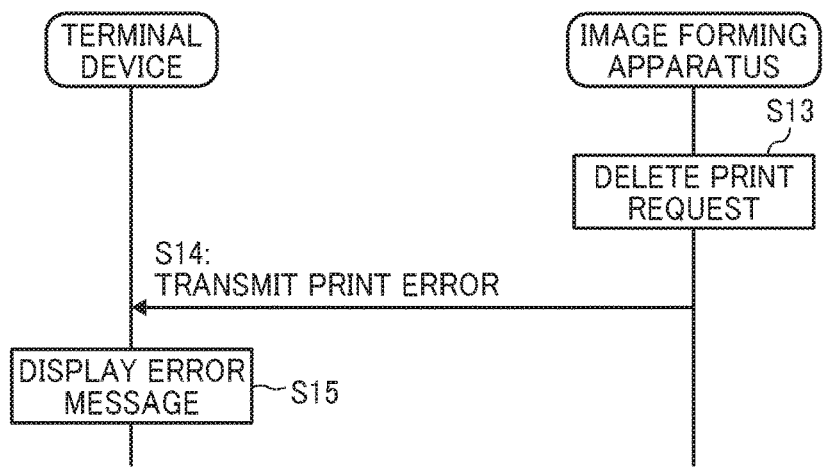
FIG. 10 is a sequence chart of an error message display to the terminal device according to Embodiment 1.

As illustrated in FIG. 10, the display controller 210 of the terminal device 2 can be configured to display an error message on the display of the control panel 16 (S15), based on the print error transmitted from the image forming apparatus 1 to the terminal device 2 being the source of the print request. That is, the display of the control panel 16 presents, an error message, such as "printing on sheet in the selected tray requires user registration for target printer by administrator". The operator requests the administrator to register the serial number of the print application used by the operator. Once the serial number of the print application is associated with the locked tray in the tray authority table stored in the tray authority storing unit 152 of the image forming apparatus 1, the operator is permitted of printing on sheets stored in the locked tray.

Figure 11:
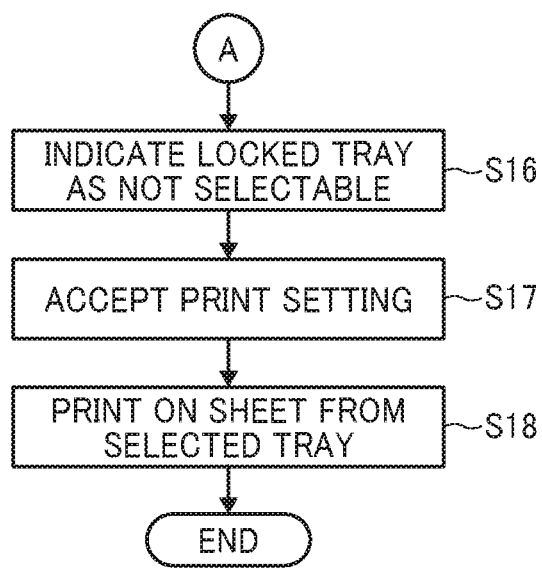
FIG. 11 is a flowchart illustrating operation of the image forming apparatus 1 according to Embodiment 1.

Referring to FIG. 11, descriptions are given below of the operation flow A illustrated in FIG. 9. At S16, the image formation controller 130 controls the display controller 110 to indicate that the tray associated with the status "Locked" in the tray type table is not selectable on the control panel 16. For example, indicating the tray as not selectable means that the tray is not displayed on the control panel 16 or visual presentation (e.g., color or characters) of the tray is changed so that the user understands that the tray is not selectable.

If the operator's request is a copy request, the copy processing unit 133 accepts the information on the tray selected by the operator, of the trays displayed on the control panel 16 (S17). If the operator's request is a FAX request, the FAX processing unit 134 accepts the information on the tray selected by the operator, of the trays displayed on the control panel 16 (S17). Then, the recording medium is conveyed from the tray selected on the control panel 16, and printing is performed as a result of the copy processing or the FAX processing (S18).

Figure 12:
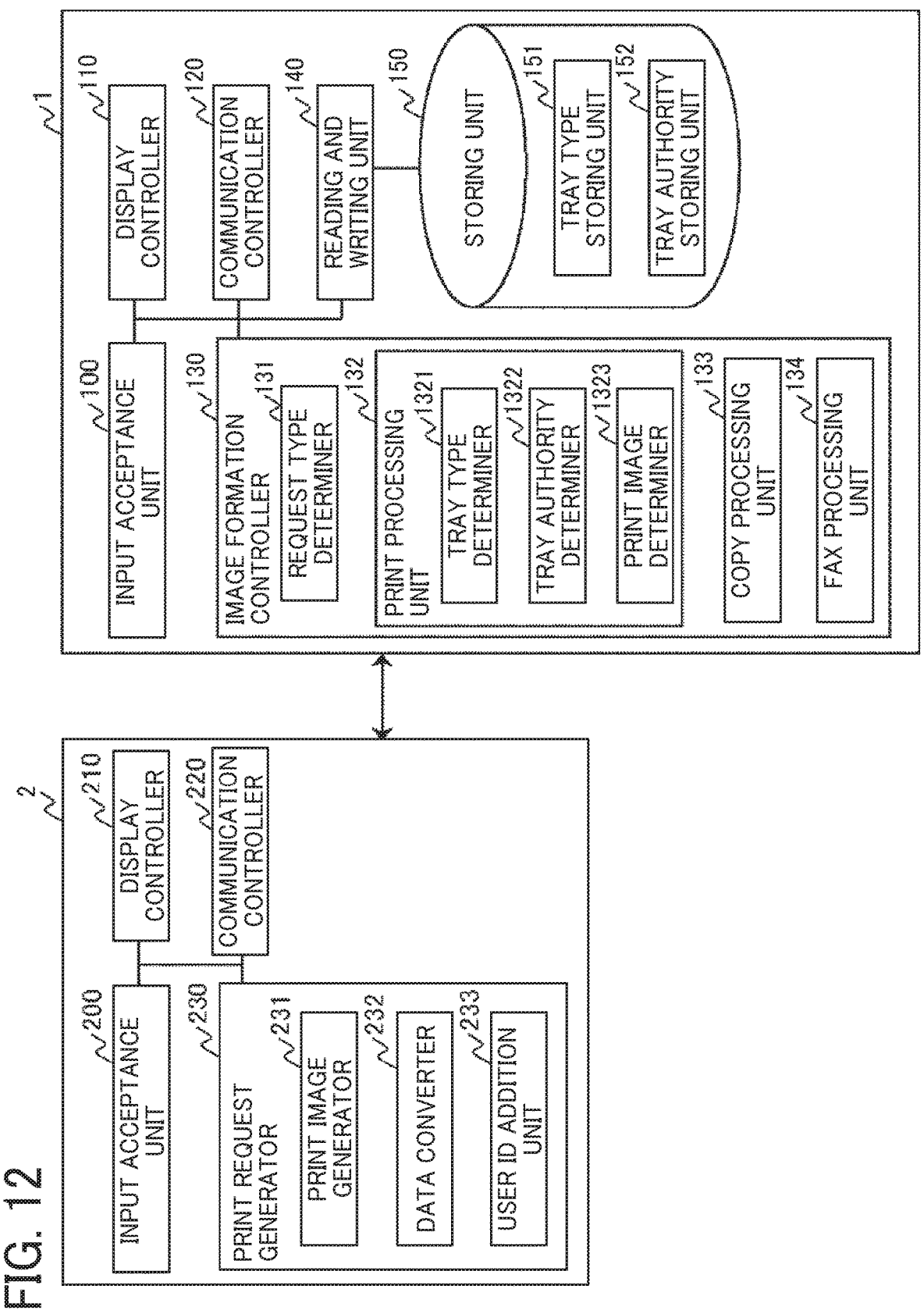
FIG. 12 is a functional block diagram of an image forming apparatus and a terminal device according to Embodiment 2.

Embodiment 2 is described with reference to FIG. 12. FIG. 12 is a functional block diagram of an image forming apparatus 1 and a terminal device 2 according to Embodiment 2. Note that, the network configuration and the hardware configuration according to Embodiment 2 are similar to those according to Embodiment 1, and redundant descriptions are omitted.

The terminal device 2 illustrated in the functional block diagram in FIG. 12 is similar to the terminal device 2 according to Embodiment 1. In the image forming apparatus 1 according to Embodiment 2, a print image determiner 1323 is added to the print processing unit 132 according to Embodiment 1. The print image determiner 1323 determines whether the print image generated by the print application 2000 is a print image suitable for printing on a sheet stored in the locked tray. If an operator instructs printing of a substantially blank print image on a recording medium in the locked tray, the recording medium, substantially as is, is taken out from the tray. Therefore, the print image determiner 1323 determines whether or not the print image instructed it appropriate. In other words, the print image determiner 1323 sets a print image condition corresponding to a specified image area rate and determines whether or not the condition is satisfied.

Figure 13:
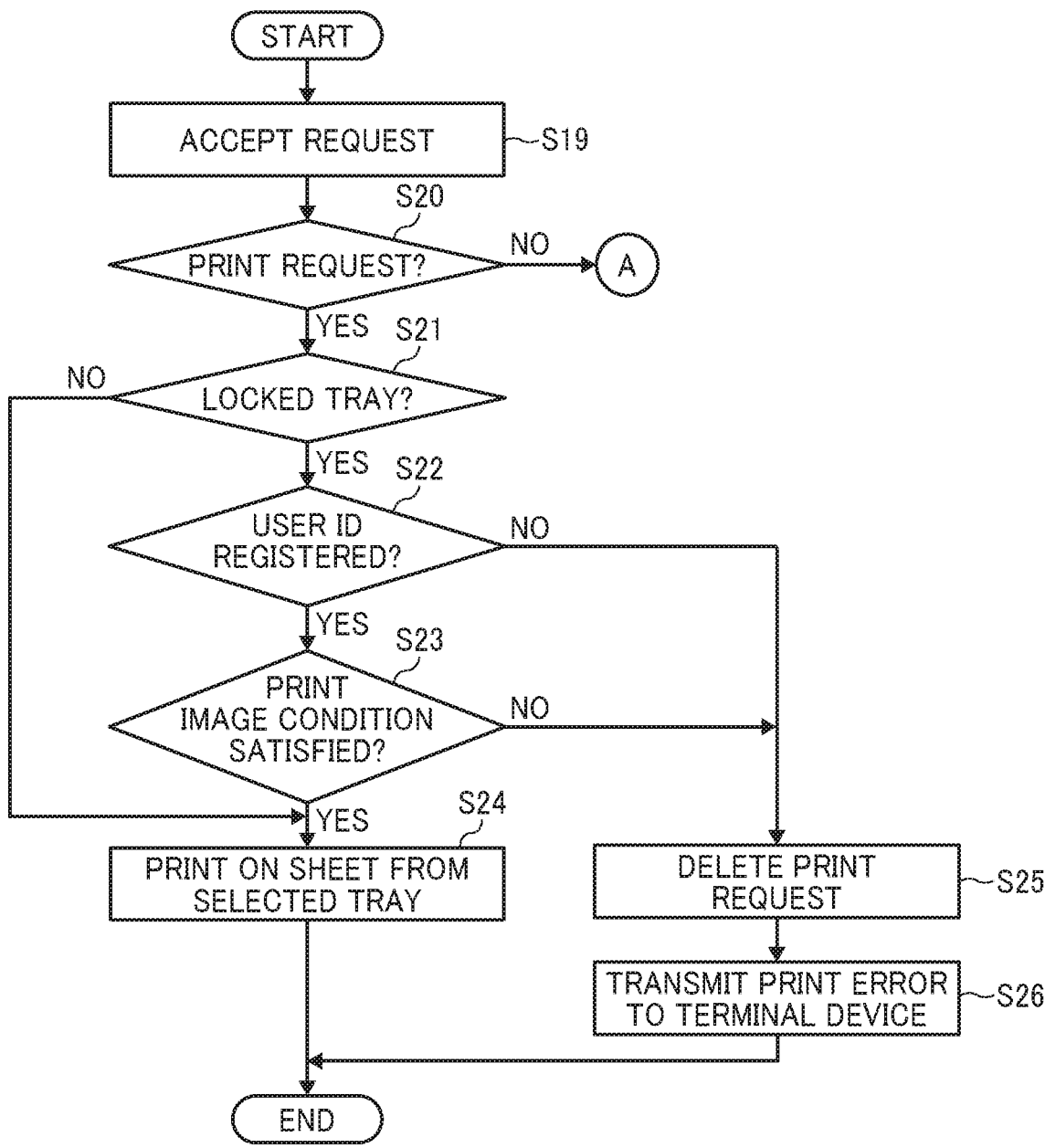
FIG. 13 is a flowchart illustrating operation of the image forming apparatus according to Embodiment 2.

Operation flow according to Embodiment 2 is described with reference to FIG. 13. The operations at S19 to S22 are the same as those at S8 to S11 in Embodiment 1, respectively. In the present embodiment, when the tray authority determiner 1322 determines that the user ID has been registered at S22, the print image determiner 1323 determines whether the print image satisfies the print image condition described later (S23). If the print image condition is satisfied, printing is performed on the recording medium fed from the selected tray (S24). If not satisfied, the print request is cancelled (S25), an error is reported to the terminal device 2, and the operation of the image forming apparatus 1 ends (S26). Similar to Embodiment 1, an error message can be displayed on the terminal device 2 based on the error report. For example, the error message can be "print image does not satisfy requirements for printing on selected sheet" and "please check whether necessary inputs are made".

One example of the print image condition is whether the area of an image to be printed on a recording medium is equal to or greater than a threshold or predetermined value. Another example is whether the coverage rate, that is, the ratio of the integrated area of the image portion to the entire sheet area is equal to or greater than a threshold or predetermined value. The coverage rate may be referred to print duty, print rate, print ratio, image area ratio, image dot ratio, or the like. Yet another example of the print image condition can be whether or not the image covers a predetermined position on the recording medium.

Since Embodiment 2 described above involves determination on whether the print image itself is appropriate, the image forming apparatus 1 can prevent erroneous printing of a blank or substantially blank print image on a recording medium fed from the locked tray.

Figure 14:
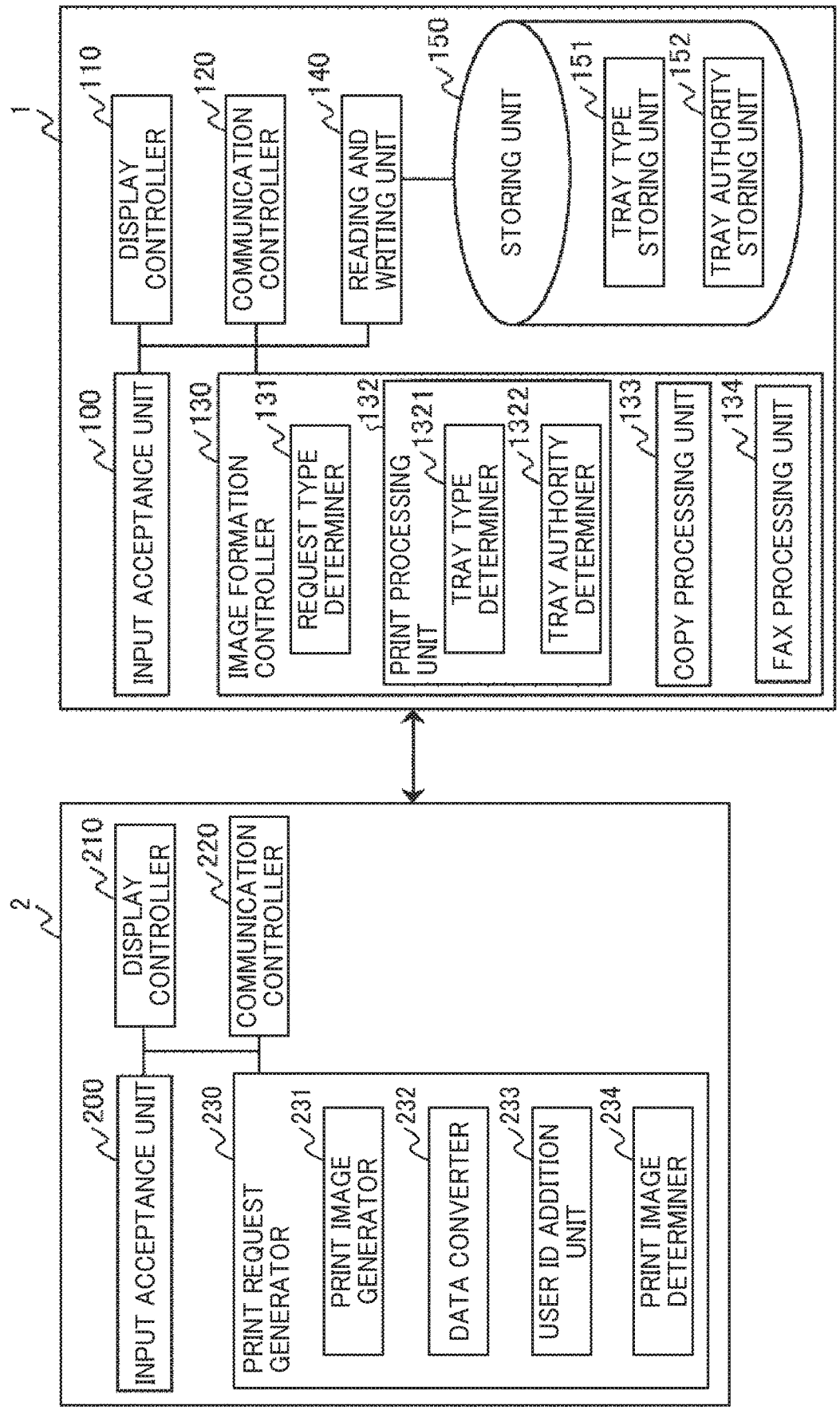
FIG. 14 is a functional block diagram of an image forming apparatus and a terminal device according to Embodiment 3.

Embodiment 3 is described with reference to FIG. 14. FIG. 14 is a functional block diagram of the image forming apparatus 1 and the terminal device 2 according to Embodiment 3. Note that the network configuration and the hardware configuration in the present embodiment are similar to those according to Embodiment 1, and redundant descriptions are omitted.

The image forming apparatus 1 illustrated in the functional block diagram in FIG. 14 is similar to that according to Embodiment 1. In the present embodiment, the print request generator 230 of the terminal device 2 according to Embodiment 1 further includes a print image determiner 234. The print image determiner 234 determines whether the print image satisfies the print image condition.

Figure 15:
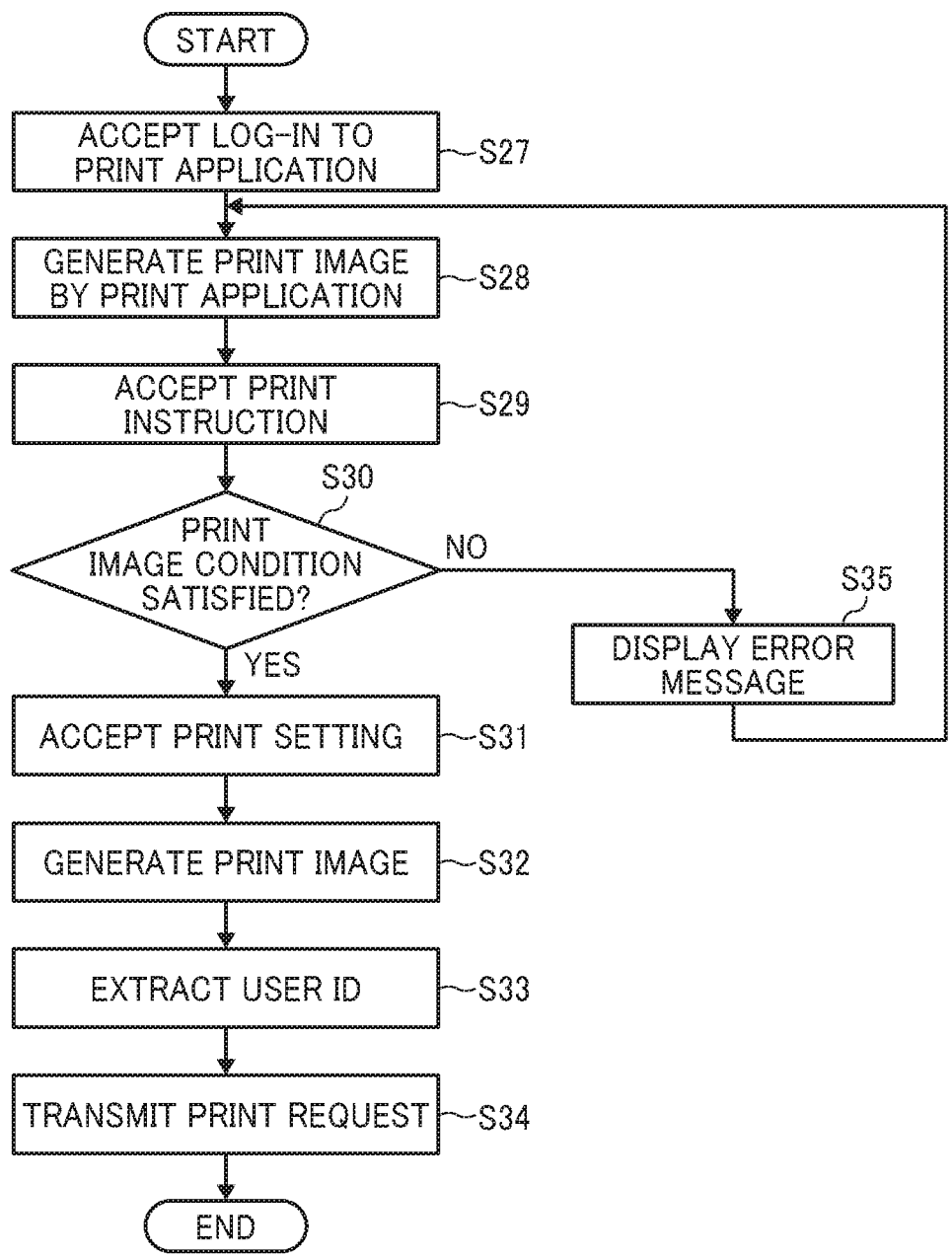
FIG. 15 is a flowchart illustrating operation of the terminal device 2 according to Embodiment 3.

Referring to a flowchart illustrated in FIG. 15, descriptions are given below of operation performed by the terminal device 2 according to Embodiment 3. Operations from S27 to S29 and from S31 to S34 are similar to those from S1 to S3 and S4 to S7 in FIG. 8. In Embodiment 1 or 2, after the image forming apparatus 1 accepts the print instruction, the operation proceeds to accepting the print settings. By contrast, in the present embodiment, after the print instruction is accepted, the print image determiner 234 determines whether or not the print image satisfies the print image condition (S30). If the print image condition is not satisfied, the print request generator 230 aborts generation of the print request, and the display controller 210 causes an error message on the display of the terminal device 2 (S35). Examples of print image condition and error messages are similar to those in Embodiment 2.

In Embodiment 3 described above, the terminal device 2 can prevent erroneous printing of a blank or substantially blank print image on a recording medium fed from the locked tray. Compared with Embodiment 2, at an earlier stage, the operator can be notified of an error of the print image, that is, before sending the print request to the image forming apparatus 1.

Figure 16:
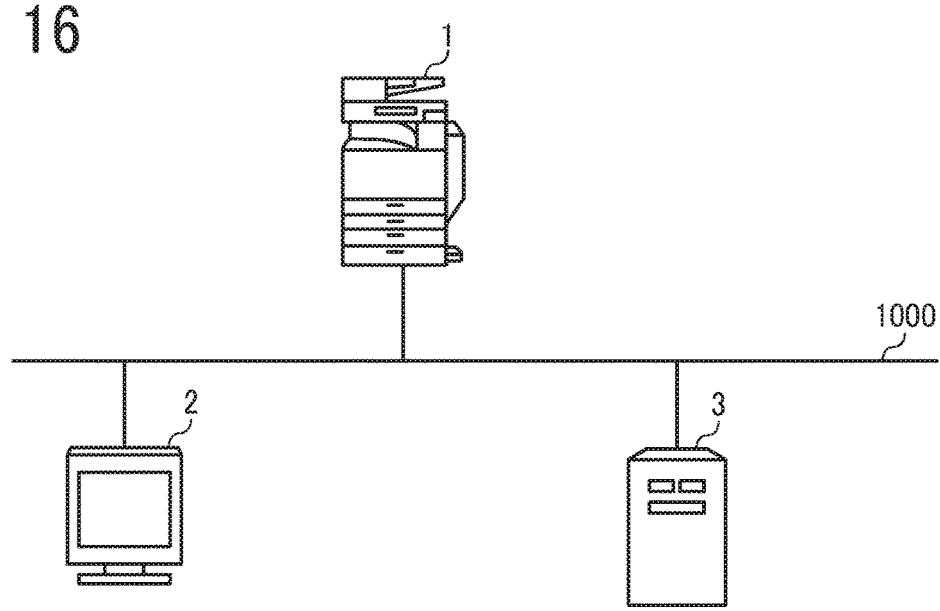
FIG. 16 is a diagram illustrating an example of a network configuration according to Embodiment 4.

Descriptions are given below of a network configuration according to Embodiment 4, with reference to FIG. 16. Compared with Embodiment 1, the network further includes a server apparatus 3 and a plurality of image forming apparatuses 1. Similar to the terminal device 2, the server apparatus 3 is connected to the image forming device 1 via the network 1000.

Figure 17:
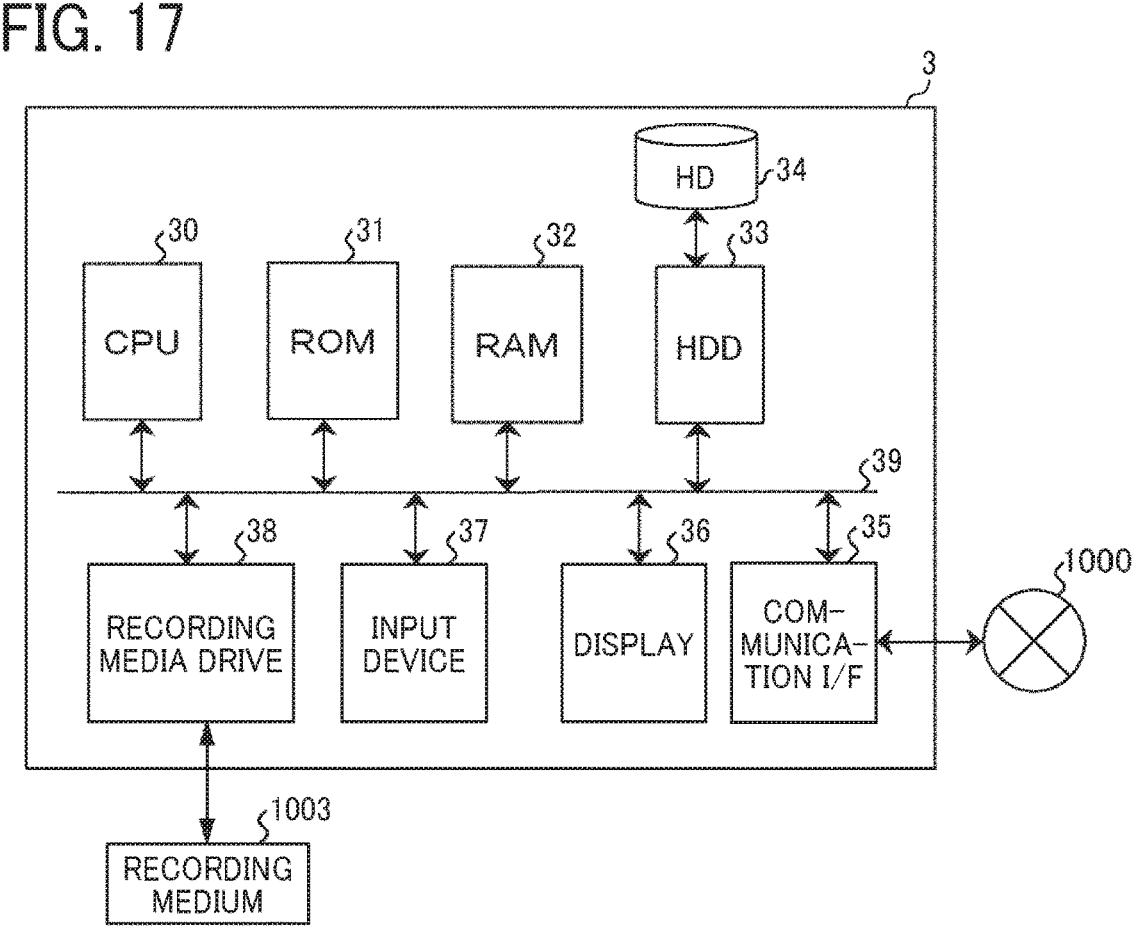
FIG. 17 is a block diagram illustrating a hardware configuration of a server apparatus according to Embodiment 4.

FIG. 17 is a block diagram illustrating a hardware configuration of the server apparatus 3. Since the configuration of the server apparatus 3 is similar to that of the terminal device 2 according to any one of Embodiments 1 to 3, redundant explanation will be omitted.

Figure 18B:
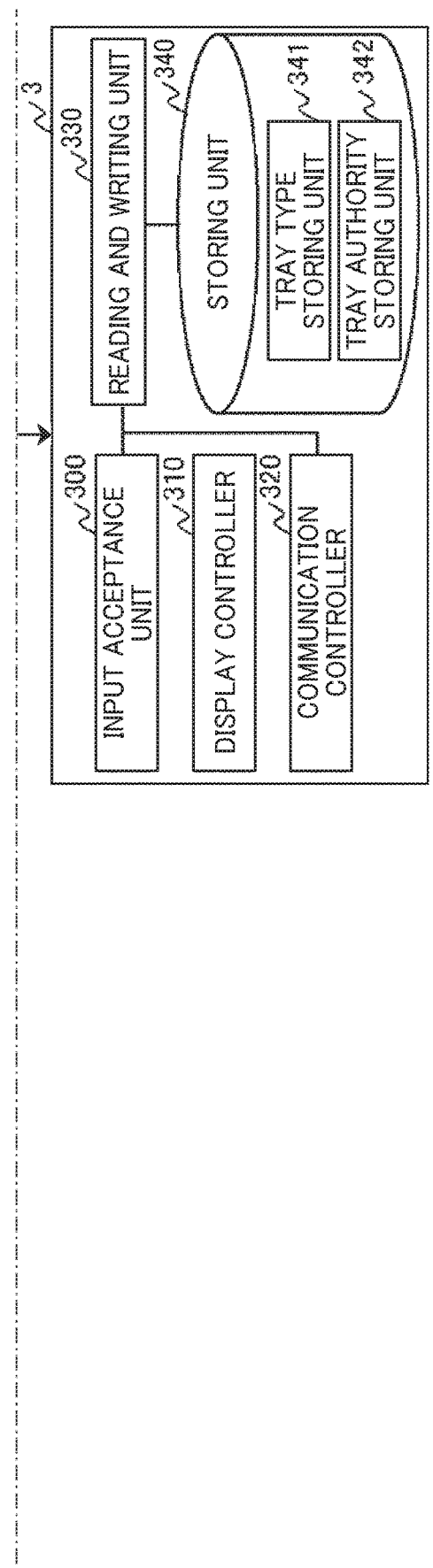

FIG. 18 is divided into FIGS. 18A and 18B for convenience of page space. FIGS. 18A and 18B are functional block diagrams of Embodiment 4. The configuration of the terminal device 2 is similar that of Embodiment 1. In Embodiment 1, the image forming apparatus 1 includes the tray type storing unit and the tray authority storing unit. By contrast, in the present embodiment, the server apparatus 3 includes a tray type storing unit 341 and a tray authority storing unit 342. In the present embodiment, an input acceptance unit 300 accepts generation and updating of tables in the tray type storing unit 341 and the tray authority storing unit 342, performed by the administrator. A reading and writing unit 330 stores the tables generated or updated in a storing unit 340. The tray type determiner 1321 and the tray authority determiner 1322 of the image forming apparatus 1 control the communication controller 120, to acquire the tray type table and the tray authority table from the server apparatus 3, respectively.

Embodiment 4 is advantageous in the case where a user to be managed uses a plurality of image forming apparatuses 1. Specifically, the administrator can manage the information collectively as long as the tables in the server apparatus 3 are updated to the latest state. Such a configuration can obviate generation of the tray type table and the tray authority table for each image forming apparatus 1.

An aspect of the present disclosure can prevent unspecified persons from discharging a recording medium (e.g., a paper sheet) stored in a tray with a lock from an image forming apparatus and taking out the recording medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

What is claimed is:

1. An image forming apparatus comprising:
   at least one of a copying device and a facsimile device;
   an interface configured to interface with a terminal device;
   a printing device configured to print a print image on recording medium;
   a plurality of trays including at least one unlockable tray and at least one lockable tray, the at least one unlockable tray configured to store unsecured recording medium of the recording medium, and the at least one lockable tray configured to store secured recording medium of the recording medium, the at least one lockable tray including a lock;
   a memory configured to store information indicating at least which of the plurality of trays is the at least one lockable tray; and
   an image formation controller configured to,
      determine, based on the information, which of the plurality of trays are the at least one lockable tray,
      generate a display associated with selecting one of the plurality of trays such that selection of the at least one lockable tray is disabled for the at least one of the copying device and the facsimile device,
      receive a print request from a user of the terminal device,
      determine, based on the information, whether the user is authorized to use the at least one lockable tray in printing,
      cause the printing device to perform printing of the print image onto the secured recording medium in the at least one lockable tray in response to the print request being from the user authorized to use the at least one lockable tray in printing, and
      cause the printing device to perform printing of the print image from the at least one of the copying device and the facsimile device onto the unsecured recording medium in a selected one of the at least one unlockable tray in response to receipt of the print image from the at least one of the copying device and the facsimile device.

2. The image forming apparatus according to claim 1, further comprising:
   a communication controller configured to,
      communicate with an external server apparatus; and
      acquire the information from the external server apparatus.

3. The image forming apparatus according to claim 1, wherein the image formation controller is configured to:
   determine whether the print image included in the print request satisfies a print image condition in response to the print request being from the terminal device, and
   cancel the print request in response to the print image not satisfying the print image condition.

4. The image forming apparatus according to claim 3, wherein the print image condition is whether an area size of an image portion to be printed on the secured recording medium is equal to or greater than a threshold.

5. The image forming apparatus according to claim 3, wherein the print image condition is whether the print image to be printed covers a set position on the secured recording medium fed from the at least one lockable tray.

6. The image forming apparatus according to claim 1, further comprising:
   an operation panel configured to accept the selection for the image forming apparatus, wherein
      the image formation controller is configured to prohibit the operation panel from accepting the selection of the at least one lockable tray for the at least one of the copying device and the facsimile device.

7. An image forming system comprising:
   an image forming apparatus including:
      at least one of a copying device and a facsimile device,
      a printing device configured to print a print image on recording medium,
      a plurality of trays including at least one unlockable tray and at least one
   lockable tray, the at least one unlockable tray configured to store unsecured recording medium of the recording medium, and the at least one lockable tray configured to store secured recording medium of the recording medium, the at least one lockable tray including a lock,
      a memory configured to store information indicating at least which of the plurality of trays is the at least one lockable tray, and
      an image formation controller configured to,
         determine, based on the information, which of the plurality of trays are the at least one lockable tray,
         generate a display associated with selecting one of the plurality of trays such that selection of the at least one lockable tray is disabled for the at least one of the copying device and the facsimile device,
         receive a print request from a user,
         determine, based on the information, whether the user is authorized to use the at least one lockable tray in printing; and
         cause the printing device to perform printing of the print image onto the secured recording medium in the at least one lockable tray in response to the print request being from the user authorized to use the at least one lockable tray in printing, and
         cause the printing device to perform printing of the print image from the at least one of the copying device and the facsimile device onto the unsecured recording medium in a selected one of the at least one unlockable tray in response to receipt of the print image from the at least one of the copying device and the facsimile device;

and a terminal device including a printer driver configured to generate the print request such that the print request generated by the printer driver includes, at least, the print image, a selected tray, and user identification information for identifying the user being a source of the print request.

8. The image forming system according to claim 7, wherein the terminal device includes a print application configured to generate the print image, and the user identification information is identification information assigned to the print application individually.

9. The image forming system according to claim 8, wherein the terminal device is configured to abort generation of the print request in response to the print image not satisfying a set condition.

10. The image forming apparatus according to claim 1, wherein the memory is configured to store the information such that the information stored in the memory further indicates users authorized to use the at least one lockable tray in printing.

11. The image forming apparatus according to claim 10, wherein the image formation controller is configured to determine, based on the information, whether the user is authorized to use the at least one lockable tray in printing by, extracting, from the print request, user identification information that uniquely identifies the user as a source of the print request, and analyzing the user identification information and the information stored in the memory to determine whether the user is authorized the use the at least one lockable tray in printing.

12. The image forming apparatus of claim 1, wherein the image forming apparatus further comprises:

a touch screen configured to, display the display such that selection of the at least one lockable tray is disabled for the at least one of the copying device and the facsimile device, and accept the selection for the image forming apparatus such that the selection of the at least one lockable tray is prohibited for the at least one of the copying device and the facsimile device.

\* \* \* \* \*